Feb. 12, 1957 H. I. BECKER, JR 2,781,127
APPARATUS FOR TESTING MAGNETS
Filed July 11, 1951 2 Sheets-Sheet 1
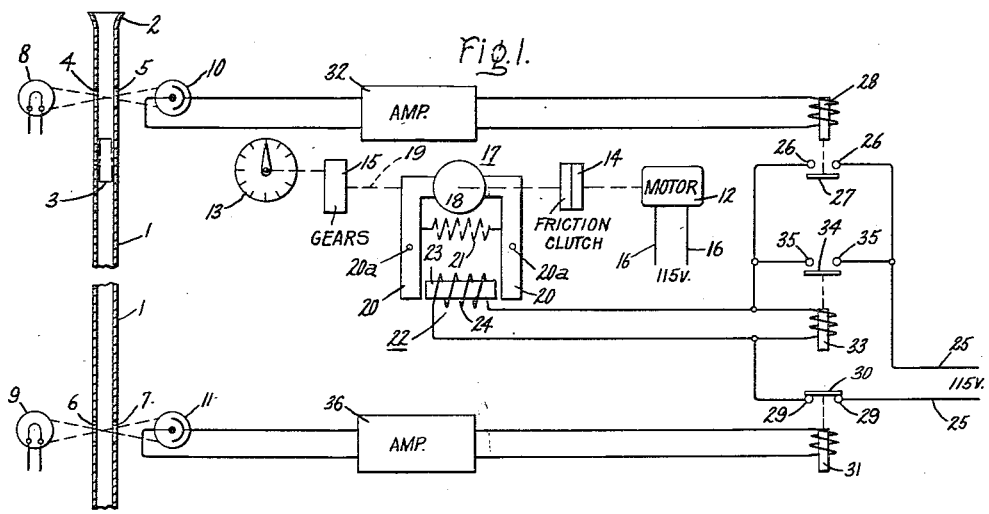
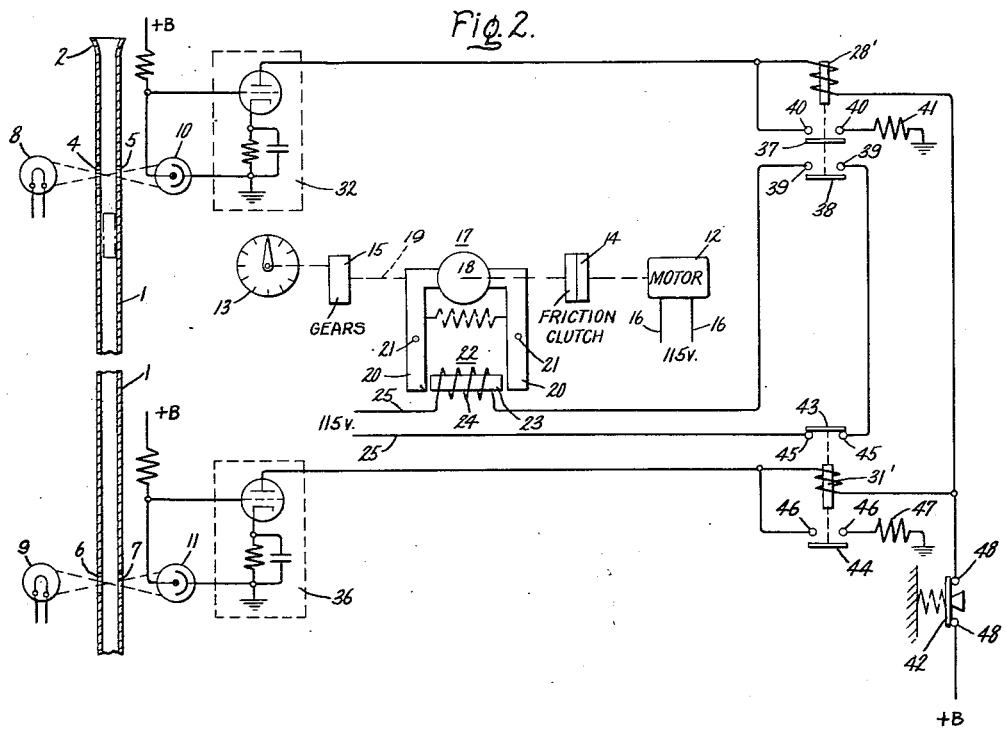
Inventor:
Howard I. Becker, Jr.,
by William G. Edwards, Jr.
His Attorney.

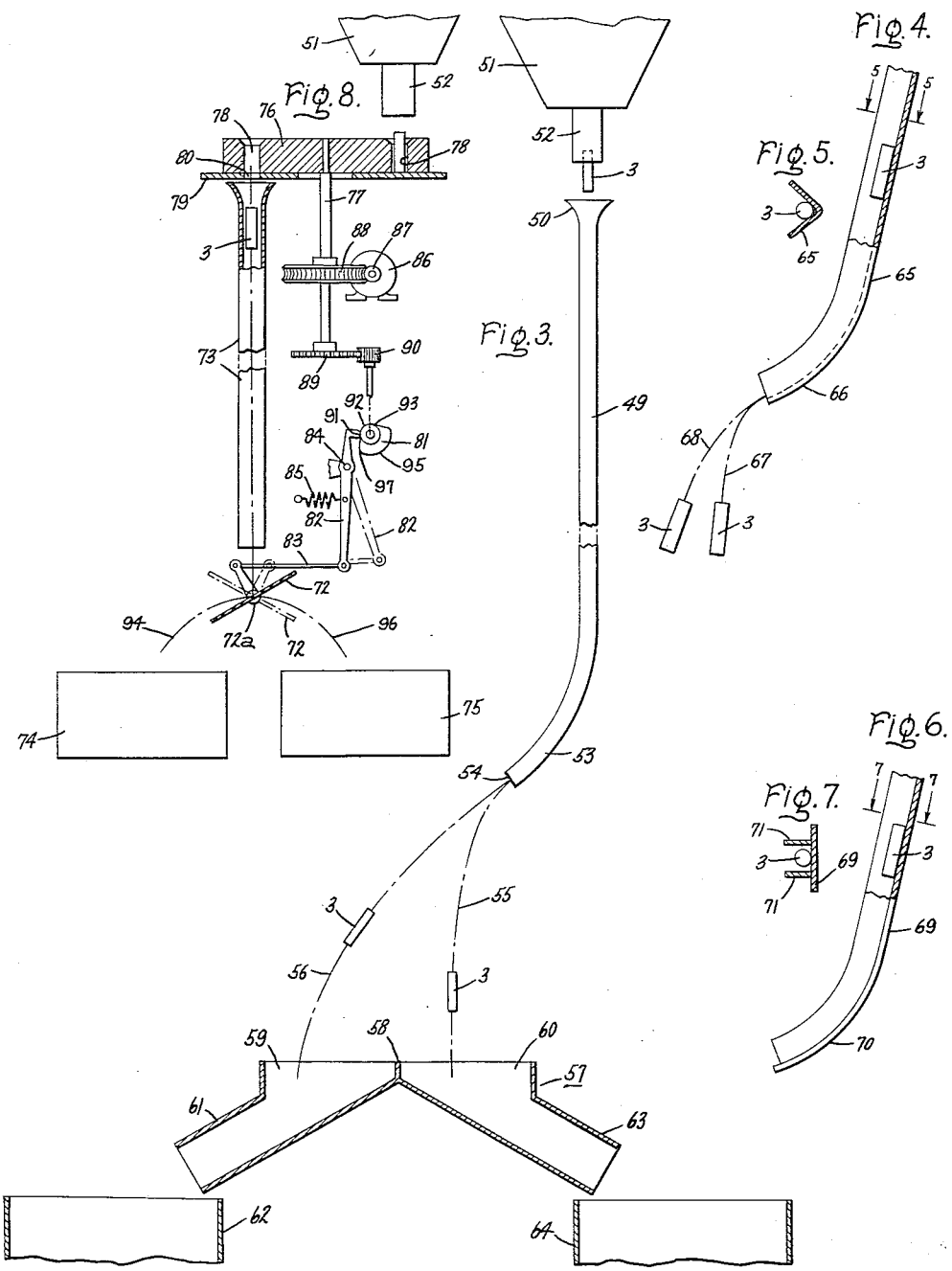

United States Patent Office 2,781,127
Patented Feb. 12, 1957

2,781,127
APPARATUS FOR TESTING MAGNETS

Howard I. Becker, Jr., Erie, Pa., assignor to General Electric Company, a corporation of New York Application July 11, 1951, Serial No. 236,202

6 Claims. (Cl. 209—115)

My invention relates to methods and apparatus for testing magnets.

It has been found that magnets made of similar composition and by similar processes will have varying magnetic strengths. In many applications it is necessary that the magnetic strength be above a predetermined minimum in order to accomplish the desired result. For example, in the copending application of Alfred G. Janos, Serial No. 122,961, filed October 22, 1949, and assigned to the same assignee as the present application, a plurality of elongated magnets are employed within a gasket on a refrigerator door for sealing the access opening of the refrigerator. In such an application it is essential that each of the magnets employed be above a predetermined magnetic strength so as to insure effective sealing throughout the length of the gasket.

Accordingly it is necessary to test the individual magnets to insure that they are at least of the required magnetic strength and, where large quantities of magnets are required as in the magnetic gasket of the above-identified application, this testing represents a substantial problem. Magnets can, of course, be tested by moving the individual magnet through a coil and reading on a galvanometer the current induced in the coil. However, where large quantities of magnets are required, as in mass production of such items as the magnetic gasket, such a tedious method of testing is obviously too slow. I have found that if a magnet is dropped through a tube of non-magnetic, electrically-conducting material, such as copper or aluminum, or is arranged to fall adjacent or in contact with a wall or a trough composed of non-magnetic, electrically-conducting material, the speed will vary in accordance with the strength of the magnet, and I employ this characteristic in my apparatus for the purpose of discriminating between magnets of various strengths.

Accordingly it is an object of my invention to provide improved apparatus for rapidly distinguishing between magnets of various strengths.

It is another object of my invention to provide an improved apparatus for automatically separating magnets above and below a predetermined strength.

It is a further object of my invention to provide improved methods for distinguishing between and separating magnets of different strengths.

Other objects and advantages of my invention will become apparent as the following description proceeds and the features of novelty which characterize my invention will be pointed out with particularity in the claims annexed to and forming part of this specification.

In carrying out the objects of my invention a generally vertical hollow member or tube or a wall is provided and magnets are dropped into the open upper end of this tube or immediately adjacent or in contact with the wall. The hollow member, or the wall, is composed of a non-magnetic, electrically-conducting member. The time required for the magnets to fall a predetermined distance is measured, thereby discriminating between magnets of different strengths. Alternatively the speed, which, of course, like the total time, varies with the magnet strength, is employed for distinguishing between and separating magnets of different strengths. In this alternative form the lower end of the tube or wall is curved so that the trajectory of the magnets will vary with the speed reached by each magnet and, hence, by properly locating receptacles, magnets above and below a predetermined strength can be separated and collected in different receptacles.

For a better understanding of my invention, reference may be had to the accompanying drawing in which Fig. 1 is a schematic illustration of one form of my invention; Fig. 2 is a modified form of the circuit arrangement shown in Fig. 1; Fig. 3 is a diagrammatic view of apparatus embodying another modified form of my invention; Fig. 4 is a view of a portion of apparatus illustrating another modified form of my invention; Fig. 5 is a sectional view taken along the lines 5—5 in Fig. 4; Fig. 6 is a view similar to Fig. 4 showing another modified form of my invention; Fig. 7 is a sectional view taken along the line 7—7 in Fig. 6; and Fig. 8 is a diagrammatic view of apparatus illustrating another modified form of my invention.

Referring to Fig. 1, there is shown a magnet testing apparatus which includes a hollow vertical member or tube 1 which is provided with a mouth 2 at its upper end for receiving magnets to be tested. In the form illustrated the magnets, one of which is shown at 3, are of elongated cylindrical shape, and the inside diameter of the tube 1 slightly exceeds that of the magnets 3 so that the magnets may fall through the tube with relatively little mechanical friction. While, in the form illustrated, a tube is employed and the magnets are of circular cross section, it will be apparent that hollow members of other cross sections, for example, oval, square, rectangular, etc., may be employed, and similarly the magnets may be of cross sections other than circular and may, if desired, be of other shapes, for example, U-shaped, in lieu of elongated.

The tube 1 is formed of any of a number of materials which are both non-magnetic and electrically-conducting. As examples, I have employed both copper and aluminum, both of which have a permeability of substantially unity and may be regarded as falling in the category of non-magnetic. As the magnet 3 falls through the tube the motion of the magnet relative to the tube causes eddy currents to be induced in the electrically-conducting material of the tube, and these eddy currents, in accordance with Lenz' law, act to set up a field opposing the motion of the magnet. The magnitude of the eddy currents so induced and hence the magnitude of the opposing force varies with the strength of the particular magnet being tested. Since the magnets being tested are of substantially the same weight the downward force acting on the magnets is substantially the same in all cases. The ultimate speed of the magnet which results from the combined effect of the force of gravity acting on the magnet to increase its speed and the opposing effect of the eddy currents tending to reduce its speed will therefore vary with the magnitude of the eddy currents and hence with the strength of the magnet which induces the eddy currents.

It can be seen therefore that magnets of different strengths will reach different speeds and hence will require different times to negotiate a predetermined distance within the tube 1. This characteristic is utilized in the apparatus of Fig. 1 for differentiating between magnets of different strengths. In the upper portion of the tube 1 two diammetrically opposite openings 4 and 5 are formed, these two openings in effect providing a transverse passage through the tube 1. Similar diammetrically opposite openings 6 and 7 providing a similar transverse passage are arranged in the lower portion of the tube 1. A light source 8 is arranged on one side of the tube 1 in line with the passage formed by the aligned openings 4 and 5, and a second light source 9 is similarly arranged on one side of the tube 1 in line with the opening section 7. On the opposite side of the tube 1 in line with the passage formed by the aligned openings 4 and 5 and in line with the light source 8 there is arranged a light-sensitive cell 10. A similar light-sensitive cell 11 is arranged in line with the openings 6 and 7 and the second light source 9. As the magnet 3 passes between the aligned openings 4 and 5 in the upper portion of the tube the light from the light source 8 is blocked from the light-sensitive cell 10. Similarly when the magnet 3 passes the opening 6 and 7 the light from the light source 9 is blocked from the light-sensitive cell 11. These interruptions of the light to cells 10 and 11 are utilized, through energization of suitable apparatus, to measure the time required for the magnet 3 to traverse the distance between the aligned openings 4 and 5 and the aligned openings 6 and 7.

The measuring apparatus includes an electric motor 12 which drives a timer or indicator 13 through a friction clutch 14 and a gear box 15. The motor 12 is supplied with power of any suitable source through lines 16 and this motor rotates continuously while the apparatus is in use. A brake 17 is provided for starting and stopping the timer or indicator 13 in accordance with the energization of the apparatus by the magnet passing the aligned openings 4, 5 and 6, 7. This brake includes a drum 18 arranged on the shaft 19 which interconnects clutch 14 and gears 15 to drive timer 13. Two brake shoes or elements 20, which are pivoted at 20a, are arranged to engage the drum 18. The brake shoes 20 are normally biased into engagement with the drum to prevent rotation of the timer 13 by a spring 21 which is connected between the two brake shoes 20. A solenoid 22, which includes a core 23 and a surrounding coil 24, is arranged between the brake shoes 20 on the opposite side of the pivot points 20a from the drum-engaging portions of the shoes. When the coil 24 of the solenoid 22 is energized the adjacent ends of the brake shoes 20 are attracted, moving the shoes out of engagement with the drum 18 and permitting free rotation of the timer or indicator 13. When the coil 24 is deenergized the shoes are pressed by the spring 21 into engagement with the drum, preventing rotation of the timer 13, rotation of the motor 12 continuing because of the interposition of the friction clutch 14.

A circuit for energizing the coil 24 is supplied from any suitable power source through lines 25. This circuit includes contacts 26 adapted to be closed by a switch 27 controlled by a relay 28, and contacts 29 adapted to be closed by a second switch 30 controlled by a second relay 31. The switch 27 is normally open and the switch 30 is normally closed. The relay 28 is energized from the light-sensitive cell 10 through a conventional amplifier 32 each time the light from the light source 8 is blocked by a magnet passing the aligned openings 4 and 5. The energization of the relay 28 closes the circuit from the power source through the lines 25 to the coil 24 of the solenoid 22. The solenoid attracts the brake shoes 20 pulling the shoes away from the drum 18, releasing the brake and allowing rotation of the timer 13 to begin. The closing of the switch 26 by the relay 28 also energizes a holding relay 33 which closes a switch 34 across contacts 35. The holding relay continues supply of power from the lines 25 through the switch 34 to the coil 24 after the magnet 3 has passed beyond the aligned openings 4 and 5 and effected deenergization of relay 28.

The relay 31 is energized from the light-sensitive cell 11 through a conventional amplifier 36 each time a magnet passes the aligned openings 6 and 7 and blocks light from the light source 9 to the light-sensitive cell 11. The energization of the relay 31 moves the switch 30 from its normally-closed position, breaking the circuit from the lines 25 to the coil 24 and the holding relay 33. This returns the circuit elements to the condition shown in Fig. 1 and deenergizes the coil 24, allowing the spring 22 to bring the shoes 20 into engagement with the drum 18, stopping rotation of the timer 13. The total elapsed time required for the magnet 3 to traverse the distance from the aligned openings 4 and 5 to the aligned openings 6 and 7 is therefore recorded by the timer or indicator 13. The greater the strength of the magnet the slower its speed and hence the greater the total time required to traverse the distance mentioned. Therefore the amount of elapsed time measured by the timer 13 can be used to indicate the relative strength of the magnets being tested. If desired the indicator 13 can be graduated to indicate directly the strength of the magnet being tested or the velocity of the magnet instead of indicating elapsed time.

By way of example, I have found that using a copper tube having a one quarter inch inside diameter and magnets $3/16$ inch in diameter and one inch long, a magnet having a flux of 2200 maxwells required five seconds to traverse a distance of five feet between the upper aligned openings 4 and 5 and the lower aligned openings 6 and 7. On the other hand a substantially unmagnetized element under the same circumstances required only $9/10$ second to traverse this distance. I have further found that the speed of the magnet is generally inversely proportional to the conductivity of the tube. Thus the speed of the same magnets falling through an aluminum tube, which has about one half the conductivity of copper, is approximately double the speed of magnets falling through a copper tube.

I have found that the following equation, although not an exact mathematical derivation, seems to fit quite nicely the experimental results, and indicates a relationship of some of the variables involved:

$$T = K(e^{b\phi^2} - 1) + \sqrt{\frac{2S}{g}}$$

where:

$T$ = time of fall in seconds
$\phi$ = flux
$S$ = length of tube
$g$ = gravitational constant The term $b$ in the equation is employed to cover such elements as wall thickness of the tube, its conductivity, weight of the magnet, and ratios of the areas of the magnet and the inside diameter of the tube. In general the items included in $b$ may be related to some extent by the following equation:

$$b = dA_1C/pWA_2$$

where:

$d$ = tube wall thickness
$p$ = resistivity of the material of the tube
$W$ = weight of the magnet
$A_1$ = cross sectional area of the magnet
$A_2$ = cross sectional area of the inside of the tube
$C$ is a proportionality constant included to absorb other unknown variables and to give the equation dimensional equality.

The equations given above are not purported to be mathematically accurate since they have been developed primarily to relate these elements as closely as possible to the experimental results achieved. They are included merely as guidance to indicate a relationship between known variables and not as a basis for accurate calculations.

A modified form of the circuit of Fig. 1 is shown in Fig. 2. The circuit of Fig. 2 differs from that of Fig.

1 primarily because of the elimination of the separate holding relay 33, and the same numerals have been used to designate corresponding parts in Figs. 1 and 2. A relay 28' corresponding to the relay 28 in the circuit of Fig. 1, is energized through the amplifier 32 from the light-sensitive cell 10 when the falling magnet 3 blocks the light through the aligned openings 4 and 5. This relay actuates an element which includes two switches 37 and 38. The switch 38 is arranged to engage contacts 39 to close a circuit from the lines 25 to the coil 24 of the solenoid 22 when the relay 28' is energized. This is similar to the engagement of this switch 27 with the contacts 26 in the circuit of Fig. 1. The switch 37 is arranged to engage contacts 40 in a holding circuit for the relay 28'. This holding circuit includes a series resistor 41, the contacts 40, the coil of the relay 28', and a manual reset switch 42, the circuit being supplied from a source of direct current power, indicated by B+ for the positive side and by a ground symbol for the negative side. Thus the energization of the relay 28' energizes the coil 24 to initiate movement of the timer or indicator 13 and closes the circuit through the contacts 40 continuing the energization of the coil of the relay 28' even after the magnet 3 has passed the aligned openings 4 and 5 and light from the source 8 again reaches the light-sensitive cell 10.

A relay 31', which is energized through the amplifier 36 from the light-sensitive cell 11, also actuates an element having two switches 43 and 44. The switch 43 which corresponds to the switch 30 of the circuit of Fig. 1 is arranged in its normally closed position to engage contacts 45 in the circuit of the coil 24. The switch 44 is arranged to engage contacts 46 in a holding circuit for the coil of the relay 31'. This holding circuit is similar to that for the relay 28' and includes a series resistor 47, the contacts 46, the coil of the relay 31' and the manual reset switch 42. When the relay 31' is energized because of the magnet 3 passing the aligned openings 6 and 7, the switch 43 is moved to its open position breaking the circuit of the coil 24 and allowing the brake shoes 20 to reengage the drum 18 stopping the rotation of the timer 13. Because of the holding circuit for the relay 31' the switch 43 is maintained in the open position even after the magnet 3 has passed beyond the aligned openings 6 and 7. Thus after a magnet 3 has traversed the tube the switch 38 of the relay 28' is held in the closed position, rather than its normally open oposition, and the switch 43 of the relay 31' is held in an open position, rather than its normally closed position. The holding circuits for the relay 28' and 31' are deenergized by pressing the manual reset switch 42, breaking the circuits at the contacts 48 and returning the various elements to the condition shown in Fig. 2. Thus with the arrangements shown in Fig. 2 it is necessary to interrupt the circuit manually by pushing the reset switch 42 after each magnet is tested.

In the forms illustrated in Figs. 1 and 2 and described above, the magnets are individually dropped into the top of the tube and the time required to fall the distance between the two light beams is observed on the timer. By noting the total time required the relative strength of the magnets tested can be determined since, as explained above, the time varies inversely with the strength, and these arrangements can be employed for separating magnets above and below a predetermined strength. However, in mass production where a large number of magnets are to be tested within a limited time these arrangements require too great an amount of time and apparatus for testing and separating the magnets more rapidly is desirable. A form of testing apparatus adapted for rapid testing and automatic separation of magnets above and below a predetermined strength is shown in Fig. 3. In the apparatus of Fig. 3 the varying speeds of magnets of different strengths are employed to give the magnets a different trajectory from the discharge end of the tube, so that the magnets above a predetermined strength are collected in one receptacle and those below a predetermined strength are collected in a second receptacle.

Referring to Fig. 3, the apparatus includes a hollow member or tube 49 which, like the tube 1 of the forms previously described, is composed of a non-magnetic, electrically-conducting material, such as copper or aluminum. The tube 49 is also arranged in a generally vertical position and includes a mouth 50 for receiving magnets 3 to be tested. The inside diameter of the tube 49 is made slightly larger than the diameter of the magnets 3, so that there is relatively little mechanical friction between the magnets and the tube. For example I have employed a tube having an inside diameter of one-quarter inch with magnets having a diameter of three-sixteenths inch and a length of one inch. Magnets in an unmagnetized state are placed in a hopper 51 and are automatically supplied from the hopper to the tube 49 in any conventional manner well known in the art for discharging items of this shape from a hopper. After leaving the hopper and before reaching the mouth 50 of the tube 49 the magnets are magnetized by magnetizing coil 52. The magnets 3 then pass into the tube 49 and, as in the form previously described, cause eddy currents to be induced in the tube 49. These eddy currents generate an opposing force which resists acceleration of the magnets 3. The amount of this opposing force, also as explained previously, varies with the strength of the magnet and hence the speed reached by the magnet in the tube 49 varies with the strength of the magnet being tested.

I have found that in this apparatus a magnet with high residual flux generally achieves it final discharge velocity within a fall of one inch, using magnet sizes and tube sizes of the dimensions mentioned above. I have further found that the following equation seems to fit most closely the experimental results which I have observed insofar as this final velocity is concerned:

$$V = gpA_2m/C_1\phi^2A_1d$$

where:

$g$ = gravitational constant
$p$ = resistivity of the material of the tube
$A_2$ = cross sectional area of the inside of the tube
$m$ = mass of the magnet
$C_1$ = a proportionality constant similar to that employed in the equation for "$b$" above
$\phi$ = flux
$A_1$ = cross sectional area of the magnet
$d$ = tube wall thickness Again, this equation, like those given previously, does not represent an accurate theoretical derivation but has been set up because it seems to correlate most closely the test results observed. At any rate the force of gravity acting to accelerate the magnet does not change during the test whereas the opposing force which may be represented generally by the equation $F_e = \phi^2 A_1 C_1 dV/pA_2$ increases as the velocity of the magnet increases. Ultimately a balance of forces is achieved at which the velocity of the magnet no longer increases, and, as mentioned above, I have found that this final velocity is achieved under the conditions described above within about one inch of the movement of the magnet in the tube. Since the opposing force is dependent on the strength of the magnet and increases with the strength of the magnet it can be seen that the ultimate velocity of the magnet is inversely proportional to its strength, as indicated by the equation set forth above, and this variation in speed of the magnet with its strength is utilized in the apparatus of Fig. 3 to effect an automatic separation of magnets above and below a predetermined strength.

To effect this separation the lower end of the tube 49 is inclined at an angle of about 45°, as indicated at 53. Magnets having a relatively high strength will have a relatively low velocity in being discharged from the end 54 of the tube and will fall in an almost vertical path, as indicated at 55. On the other hand relatively weak magnets have a relatively high velocity being discharged from the end 54 the tube in a direction substantially in line with the portion 53 of the tube; hence such magnets follow the general trajectory indicated at 56. Magnets of varying strengths will follow varying paths between the paths 55 and 56 indicated.

A separator 57 is provided below the discharge end 54 of the tube for receiving the discharged magnets and directing them in one of two paths depending on the relative strengths of the magnets. The separator 57 includes a top opening having a central divider 58 for dividing this opening into two sections 59 and 60. The section 59 into which the relatively weak magnets following the trajectory 56 are received directs the magnets through a discharge conduit 61 into a receptacle 62. On the other hand the section 60 which receives the magnets having a strength above the predetermined level discharges these magnets through a conduit 63 into a receptacle 64 provided for good magnets. As an additional precaution, to minimize later errors, a demagnetizing coil may be provided between the discharge end of the conduit 63 and the receptacle 64 for demagnetizing the good magnets before they are used for assembling within a refrigerator gasket for example, so that danger of accidentally mixing the poor magnets with the good magnets after testing is minimized. It is desirable that the good magnets be demagnetized before assembly and then later remagnetized since magnets having even a small residual flux may not operate successfully in some loading machines because of the inability of such machines to separate the magnets one from another. To vary the rejection level the separator 57 may be moved to the right or left, or, alternatively, the divider 58 may be made movable so that it can be shifted to one side or the other of the top opening of the separator.

In the form of invention shown in Fig. 3, a hollow member or tube 49 is employed. This provides a convenient arrangement for guiding the magnets, retarding their speed, and directing them into separate collecting receptacles. However, in order to provide a retarding effect and hence discrimination between magnets above and below a predetermined strength, it is not necessary that a hollow or tubular structure be employed for receiving and guiding the magnets. In the form of invention shown in Fig. 4 a trough 65 of V-shaped cross section is employed in lieu of the tube 49 used in Fig. 3. The trough is composed of a material, such as copper or aluminum, which is non-magnetic and electrically conducting. In order to insure that the magnets 3 in falling from the top of the trough 65 to its discharge end are maintained adjacent or at least in the immediate vicinity of the walls of the trough 65 so as to be affected by the retarding influence of the eddy currents therein, the trough 65 is slightly inclined, as illustrated in Fig. 4. Magnets 3, therefore, tend to slide along the bottom of the trough 3 and the opposing field resulting from the eddy currents induced in the wall of the trough acts on the magnets to retard the free fall thereof.

As in the form illustrated in Fig. 3, the lower end of the trough 65 is bent or curved as indicated at 66, so that the discharge end is at an angle of about 45° with the vertical. Hence the magnets 3 discharged from the trough 65 will have different trajectories, as indicated at 67 and 68 depending on the strengths of the magnets, and the magnets can, therefore, be separated in the same manner as in the form shown in Fig. 3.

Another modified form of my invention is shown in Figs. 6 and 7. This form is similar to that shown in Figs. 4 and 5 except that a relatively flat strip or wall 69 of non-magnetic, electrically-conducting material is employed in lieu of the V-shaped trough 65. The strip or wall 69 is slightly inclined from the vertical for the same reason as the trough 65 and the lower end thereof is bent or curved, as indicated at 70, to provide a discharge end inclined at about 45° to the vertical for the purpose of imparting differing trajectories to magnets of different strengths and hence different discharge speeds. In order to guide the magnets 3 along the strip or wall 69 two spaced walls 71 are arranged in engagement with the wall 69 and extending perpendicular thereto. The walls 71 may be made of any non-magnetic material and, if desired, to increase the opposing magnetic field, these walls may also be made of electrically-conducting material. However, so long as an electrically-conducting, non-magnetic material is employed for the wall 69, the walls 71 may be made of any desired non-magnetic material.

The form illustrated in Figs. 6 and 7 operates in the same manner as the form shown in Figs. 4 and 5, different trajectories being imparted to magnets of different strengths so that these magnets may be directed into separate collecting receptacles.

In Fig. 8, there is shown a modified form of apparatus for automatically separating magnets of different strengths in which a movable vane 72 of non-magnetic material is employed in lieu of the inclined lower end of the hollow member or tube. The vane 72 is pivoted at 72a. The position of the vane is synchronized with the discharge of the magnets 3 into a hollow member or tube 73 of non-magnetic, electrically-conducting material so that weak, and hence rapidly falling, magnets are directed into a receptacle 74 and strong, and hence slowly falling, magnets are directed into a second receptacle 75. While a hollow member 73 has been illustrated in Fig. 8, it will be apparent that members having the cross sections shown in Figs. 5 and 7 could be employed, if desired. Magnets in an unmagnetized state are placed in the hopper 51 and are automatically supplied from the hopper in any conventional manner well known in the art for discharging items of this shape from a hopper. After leaving the hopper, the magnets pass through the magnetizing coil 52. Each of the magnets is directed into a horizontal drum 76 which rotates about a vertical axis or shaft 77 and is disposed beneath the hopper and magnetizing coil. The drum 76, which is composed of non-magnetic material, includes a plurality of vertical passages or openings 78 arranged in spaced relationship annularly in the drum 76. As the drum 76 is rotated about its axis 77, the passages 78 successively pass beneath the hopper 51 and the magnetizing coil 52, and magnets 3 are received in these openings or passages 78. Beneath the drum 76, there is disposed a stationary horizontal plate 79 having an opening 80 therein arranged for convenience approximately diametrically opposite to the discharge point of the magnets from the coil 52. The upper end or mouth of the tube 73 is positioned directly below this opening 80 so that, as a particular magnet is moved during rotation of the drum 76 into alignment with the opening 80 it falls through the opening 80 and into the tube 73. The magnets 3 fall through the tube 73 as in previously described forms of invention and are discharged into the receptacle 74 or the receptacle 75 depending on whether the vane 72 occupies the solid line or the dotted line position.

The position of the vane is controlled by a cam 81 through a cam follower 82 and a linkage 83. The cam follower 82 is pivoted at 84 and is biased into engagement with the cam by a spring 85. The drum 76 and the cam 81 are driven by a common electric motor 86 through suitable gear trains, so that the motion of the drum and hence the discharge of the magnets through the opening 80 is coordinated with the position of the vane 72. The shaft 77 upon which the drum 76 is mounted is driven from the motor 86 through a worm gear 87 and pinion 88. A gear 89 is mounted on the lower end of this shaft and engages a pinion 90 to drive the cam 81.

The gear ratios are chosen so that the cam 81 makes one revolution during the time the drum 76 rotates a distance equal to the spacing between successive passages or openings 78 therein. Thus the vane 72 completes one cycle during the time the drum 76 is rotating from a position wherein a particular passage 78 is aligned with the opening 80 to a position when the next adjacent passage is so aligned. The driving mechanisms are also correlated so that, with counterclockwise rotation of the cams 81, the cam follower 82 engages the cam 81 at approximately the point 91 at the time a magnet 3 is allowed to fall through the opening 80 from an aligned passage 78. Thus at the time a magnet 3 is discharged from the drum 76, the vane 72 occupies the solid line position shown in Fig. 8, and the vane remains in this position during the time the cam follower 82 rides along the surface 92 of the cam to the point 93 thereon. The time for the cam to rotate through this distance is chosen relative to the length of the tube 73, in other words relative to the distance from the drum to the vane 72, so that magnets below a predetermined strength will traverse the distance from the drum to the vane 72 by the time the cam has rotated to the point where the follower engages the point 93 thereon. Hence any magnet which is sufficiently weak that it reaches the vane 72 during this time is deflected from the vane into the receptacle 74 as indicated by the dashed line 94.

As the cam 81 continues to rotate beyond the position shown in Fig. 8, the cam follower 81 rides up onto the surface 95. This causes counterclockwise movement of the cam follower 82 and, through the linkage 83, clockwise movement of the vane 72 to the dotted line position shown in Fig. 8. With this position of the vane 72 any magnet falling through the tube 73 and striking the vane is deflected into the receptacle 75, as indicated by the dotted line 96. Hence any magnet above a predetermined strength and therefore, in accordance with the previous discussion, falling below a predetermined speed does not reach the vane 72 until after the vane has been shifted to the dotted line position. Such magnets above the predetermined minimum strength are, therefore, deflected into and collected in the receptacle 75. The vane 72 is maintained in the dotted line position while the cam follower 82 rides along the surface 95 of the cam to the point 97. At this time the cam follower rides down to the surface 92 of the cam, and the vane 72 is returned to its solid line position. As indicated previously, the movement of the cam and the movement of the drum are correlated so that the follower 82 reaches the point 91 on the cam surface and hence the vane 72 is returned to its solid line position at the time the next succeeding passage 78 is aligned with the opening 80 in the plate 79. Accordingly, a magnet 3 is then discharged from the drum and, if this magnet falls through the length of the tube 73 to the vane 72 within the time required for the follower to traverse the portion of the cam surface between the points indicated at 91 and 93, the magnet is below the predetermined minimum strength and is deflected into the receptacle 74. On the other hand, if the magnet is above the predetermined minimum strength a greater amount of time is required for the magnet to traverse the distance through the tube 73. In such case the cam rotates sufficiently during the fall of the magnet that the cam follower rides up onto the surface 95 and effects a shifting of the vane 72 to the dotted line position before the magnet reaches the vane. The magnet is, therefore, deflected into the receptacle 75 provided for collecting magnets above the predetermined minimum strength.

While I have shown and described specific embodiments of my invention, I do not desire my invention to be limited to the particular construction shown and described and I intend, by the appended claims, to cover all modifications within the spirit and scope of my invention.

What I claim as new and desire to secure by Letters Patent of the United States is:

1. Apparatus for testing magnets comprising a generally vertical elongated member composed of a non-magnetic electrically-conducting material, said member being arranged to receive magnets to be tested at the upper end thereof, said member being of trough-shaped cross section and being inclined with respect to the vertical for causing the magnets to follow a path adjacent said member, said member including at its lower end a section further inclined from the vertical whereby the trajectory of magnets discharged from said lower end of said member varies with the speed of the magnets.

2. Apparatus for testing magnets comprising a generally vertical elongated strip member composed of a non-magnetic electrically-conducting material, said member being inclined with respect to the vertical and being arranged to receive magnets to be tested at the upper end thereof, two strips of non-magnetic material secured in spaced relationship to the magnet-receiving face of said strip member for guiding the magnets, the lower end of said strip member being further inclined from the vertical whereby the trajectory of magnets discharged from said lower end of said strip member varies with the speed of the magnets.

3. Apparatus for testing physically similar magnets comprising a generally vertical elongated hollow member composed of a non-magnetic electrically-conducting material, said member being adapted to receive magnets of a predetermined size at the top thereof and to allow said magnets to fall downwardly thereinside, the inner wall of said member being in close proximity to said magnets during the fall thereof to cause the fields of said magnets to set up eddy currents in said member, whereby the reaction between said fields and the induced eddy current field of said member cause different strength magnets to assume different velocities, and means responsive to the velocity only of said magnets for separating magnets above and below a predetermined strength.

4. Apparatus for testing physically similar magnets comprising a generally vertical elongated member composed of a non-magnetic electrically-conducting material, said member being adapted to receive magnets of a predetermined size and to guide said magnets in a fall path, means for maintaining said magnets in close proximity to said member during the falling thereof to cause the fields of said magnets to set up eddy currents in said member, whereby the reaction between said fields and the induced eddy current field of said member cause different strength magnets to assume different velocities, with said member being inclined from the vertical at its lower end to cause the trajectory of magnets discharged from said lower end of said member to vary with the velocities of said magnets.

5. Apparatus for testing physically similar magnets comprising a generally vertical elongated hollow member composed of a non-magnetic electrically-conducting material, said member being adapted to receive magnets of a predetermined size at the top thereof and to allow said magnets to follow downwardly thereinside, the inner wall of said member being in close proximity to said magnets during the fall thereof to cause the fields of said magnets to set up eddy currents in said member, whereby the reaction between said fields and the induced eddy current field of said member cause different strength magnets to assume different velocities, with said member being inclined from the vertical at its lower end to cause the trajectory of magnets discharged from said lower end of said member to vary with the velocities of said magnets.

6. Apparatus for testing physically similar magnets comprising a generally vertical elongated hollow member composed of a non-magnetic electrically-conducting material, said member being adapted to receive magnets of a predetermined size at the top thereof and to allow said magnets to follow downwardly thereinside, the inner wall of said member being in close proximity to said magnets during the fall thereof to cause the fields of said magnets to set up eddy currents in said member, whereby the reaction between said fields and the induced eddy current field of said member cause different strength magnets to assume different velocities, with said member being inclined from the vertical at its lower end to cause the trajectory of magnets discharged from said lower end of said member to vary with the velocities of said magnets, and receptacles disposed in horizontally spaced positions below said lower end of said member for separately collecting magnets above and below a predetermined strength.

References Cited in the file of this patent

UNITED STATES PATENTS

| | | |
|---|---|---|
| 1,003,704 | Charlton | Sept. 19, 1911 |
| 1,780,952 | Symmes | Nov. 11, 1930 |
| 2,314,063 | Anderson | Mar. 16, 1943 |
| 2,427,774 | Fredrickson | Sept. 23, 1947 |
| 2,444,751 | Scott | July 6, 1948 |